US012680655B2

(12) United States Patent
Zhao et al.

(10) Patent No.: US 12,680,655 B2
(45) Date of Patent: Jul. 14, 2026

(54) GEAR TRANSMISSION AND ROTATION AMPLIFICATION TYPE DEVICE FOR REDUCING SLOSHING

(71) Applicants: GUANGXI UNIVERSITY, Nanning (CN); DALIAN UNIVERSITY OF TECHNOLOGY, Dalian (CN)

(72) Inventors: Yi Zhao, Nanning (CN); Ke Yang, Nanning (CN); Hongnan Li, Nanning (CN); Miao Cui, Nanning (CN); Linsheng Huo, Nanning (CN)

(73) Assignees: GUANGXI UNIVERSITY, Nanning (CN); DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 18/951,924

(22) Filed: Nov. 19, 2024

(65) Prior Publication Data

US 2025/0075862 A1 Mar. 6, 2025

Related U.S. Application Data

(63) Continuation of application No. PCT/CN2024/091470, filed on May 7, 2024.

(30) Foreign Application Priority Data

Mar. 26, 2024 (CN) ........................ 202410346705.2

(51) Int. Cl.
*F17C 13/12* (2006.01)
*B65D 90/52* (2006.01)

(52) U.S. Cl.
CPC ........... *F17C 13/126* (2013.01); *B65D 90/52* (2013.01); *F17C 2260/016* (2013.01)

(58) Field of Classification Search
CPC .. F17C 13/126; F17C 2260/016; B65D 90/52; B60P 3/2235
See application file for complete search history.

(56) References Cited

U.S. PATENT DOCUMENTS 11,618,535 B1 * 4/2023 Williams ................ B63B 43/06 114/125
2001/0009257 A1 * 7/2001 Bauer .................. B60K 15/077 137/574

(Continued)

FOREIGN PATENT DOCUMENTS

CN 106763460 A 5/2017
CN 112050071 A 12/2020

(Continued)

*Primary Examiner* — Shawn M Braden
(74) *Attorney, Agent, or Firm* — MUNCY, GEISSLER, OLDS & LOWE, P.C.

(57) ABSTRACT

A gear transmission and rotation amplification type device for reducing sloshing is arranged inside and located above a body of an LNG storage tank. The device includes a combination disc, a wheel set, an outer sleeve, an overhanging fan blade, ball screws, springs and a sloshing plate. The combination disc is connected with the sloshing plate below through the springs. The combination disc is fixed above an inner wall surface of the body of the LNG storage tank, while the sloshing plate is fitted but not fixedly connected with the inner wall surface of the body of the LNG storage tank. The wheel set, the outer sleeve, the overhanging fan blade and the ball screws are arranged between the combination disc and the sloshing plate and located below the liquid level in the LNG storage tank.

5 Claims, 5 Drawing Sheets

(56) References Cited

U.S. PATENT DOCUMENTS

| | | | | |
|---|---|---|---|---|
| 2017/0328311 | A1* | 11/2017 | Franklin | F16K 31/52408 |
| 2018/0266578 | A1* | 9/2018 | Baxter | B65D 90/52 |
| 2025/0129897 | A1* | 4/2025 | Zhao | F16F 7/1011 |
| 2025/0163983 | A1* | 5/2025 | Dong | E04B 1/98 |

FOREIGN PATENT DOCUMENTS

| | | | |
|---|---|---|---|
| CN | 113847384 | A | 12/2021 |
| CN | 115247752 | A | 10/2022 |
| JP | 2005314000 | A | 11/2005 |
| JP | 2005326026 | A | 11/2005 |
| JP | 2007071399 | A | 3/2007 |
| KR | 102142154 | B1 | 8/2020 |

* cited by examiner

GEAR TRANSMISSION AND ROTATION AMPLIFICATION TYPE DEVICE FOR REDUCING SLOSHING

CROSS REFERENCE TO RELATED APPLICATIONS

This application is a Continuation of International Application No. PCT/CN2024/091470, filed on May 7, 2024, and for which priority is claimed under 35 U.S.C. § 120; and this application claims priority of application No. 202410346705.2 filed in China on Mar. 26, 2024 under 35 U.S.C. § 119, the entire contents of all of which are hereby incorporated by reference.

TECHNICAL FIELD

The present invention belongs to the technical field of major lifeline engineering, relates to a device for reducing sloshing for LNG (Liquefied Natural Gas) storage tanks, and particularly relates to a gear transmission and rotation amplification type device for reducing sloshing.

BACKGROUND

LNG is liquid that natural gas becomes after being compressed and cooled to −162° C. Compared with the traditional coal and petroleum, LNG is cleaner and more efficient green energy. The LNG storage tank relates to the technical field of the major lifeline engineering of the city, and its ability to withstand natural disasters such as earthquakes is an important reference index of the facility. Under the action of the earthquakes, the storage tank will lose the functions, which causes fire or explosion, thereby endangering the safety of personnel and property in the surrounding area, and causing serious economic losses.

Under the action of the earthquakes, the liquid in the LNG storage tank sloshes, which causes additional hydrodynamic pressure on the wall of the storage tank, thereby affecting the safety of the storage tank structure. The sloshing liquid may also directly impact a ceiling, which causes damage to pipe joints and accessories. To reduce the seismic response of the LNG storage tank, base isolation is adopted. It is found from research that a seismic isolation system can effectively reduce the seismic response of the storage tank structure. However, after seismic isolation, the sloshing wave height of the liquid may be increased, so that a liquid level sloshes aggravatingly. Therefore, to ensure the safety of the storage tank structure, a device that can effectively reduce the sloshing wave height of the stored liquid needs to be designed to solve the existing practical problems.

SUMMARY

The purpose of the present invention is to provide a device for reducing sloshing that can effectively reduce the sloshing wave height of a liquid level in a large LNG storage tank, to liquid sloshing amplitude, so as to weaken the influence of liquid level sloshing caused by earthquakes on the storage tank structure.

To achieve the above purpose, the present invention adopts the following technical solution:

A gear transmission and rotation amplification type device for reducing sloshing is arranged inside and located above a body of an LNG storage tank; and the device for reducing sloshing for the large LNG storage tank comprises: a combination disc 1, a wheel set 2, an outer sleeve 3, an overhanging fan blade 4, ball screws 5, springs 6 and a sloshing plate 7, wherein the combination disc 1 located above is connected with the sloshing plate 7 below through the springs 6;

the combination disc 1 is fixed above an inner wall surface of the body of the LNG storage tank; the sloshing plate 7 is fitted and not fixedly connected with the inner wall surface of the body of the LNG storage tank; the wheel set 2, the outer sleeve 3, the overhanging fan blade 4 and the ball screws 5 are arranged between the combination disc 1 and the sloshing plate 7; and except for the combination disc 1 and the springs 6, the others are located below the liquid level in the LNG storage tank. The combination disc 1 comprises three large, middle and small sealed hollow discs with different radii, a large annular magnet 13, a small annular magnet 15, disc springs 16 and a rubber ring 11, wherein the three large, middle and small sealed hollow discs are a sealed large disc 12, a sealed middle disc 14 and a sealed small disc 17 respectively; and the three are concentric structures in initial states and are eccentric in a sloshing process. The rubber ring 11 is fixed on an outer ring of the sealed large disc 12; the large annular magnet 13 is installed on an inner ring of the sealed large disc 12; the small annular magnet 15 is installed on an inner side surface of the sealed middle disc 14; and a plurality of solid balls 18 are placed inside the sealed small disc 17. The sealed small disc 17 is installed in the sealed middle disc 14, and the two are connected through the disc springs 16; the sealed middle disc 14 is installed in the sealed large disc 12 to form the combination disc 1, that is, the outer diameter of the sealed small disc 17 is less than the inner diameter of the sealed middle disc 14; the disc springs 16 is installed in a gap after the combination; the outer diameter of the sealed middle disc 14 is matched with the inner diameter of the sealed large disc 12; the inner diameter of the rubber ring 11 is equal to the outer diameter of the sealed large disc 12, and the two are tightly fitted and fixedly installed together. The combination disc 1 is fixed inside the body of the LNG storage tank, located above the liquid level.

The wheel set 2 is located below the combination disc 1, and comprises two wheel discs with the same structure; the wheel discs are disc structures; six fan blades 21 are uniformly installed along the circumference of the disc at a spacing of 60°; baffle plates 22 are installed at equal intervals inside the wheel discs, and a plurality of balls 23 are placed; and disc surfaces of the two wheel discs are opposite and fixed at both ends of a middle transverse rod 106 respectively. The middle transverse rod 106 is provided with a second gear 105, and the middle transverse rod 106 is connected with a vertical fixed rod 101; and the vertical fixed rod 101 is connected with the middle transverse rod 106 without affecting the rotation of the middle transverse rod 106, that is, the two wheel discs can rotate by force. A top end of the vertical fixed rod 101 is fixedly connected with a bottom surface of the combination disc 1, a bottom end is connected with brackets 42 of the overhanging fan blade 4, and a middle part is socketed with the middle transverse rod 106 after bent.

The outer sleeve 3 is a sealed cylinder; an annular magnet 31 is installed on the inner side surface of a cylinder wall; damping fluid is filled inside and four ball screws 5 are installed; a second rotating shaft 107 is fixedly installed at the inner center of a top surface of the cylinder wall of the outer sleeve 3; a lower end of the second rotating shaft 107 is provided with an internal gear 35; a first rotating shaft 104 is fixedly installed at the outer center of the top surface of the cylinder wall of the outer sleeve 3; an upper end of the first rotating shaft 104 is provided with a first gear 102, that is, the upper end of the first rotating shaft 104 is fixedly connected with the first gear 102, and the lower end is fixed to the outer center of the top surface of the cylinder wall of the outer sleeve 3; an upper end of the second rotating shaft 107 is fixed to the inner center of the top surface of the cylinder wall of the outer sleeve 3 and a lower end is fixedly connected with the internal gear 35. An external gear 33 is arranged on the outer side of the top of the cylinder wall of the outer sleeve 3, and the external gear 33 is matched with a fan blade gear 45 of the overhanging fan blade 4. A bottom cover structure of the outer sleeve 3 is a composite sealed roller 32, which is composed of a sealed large roller and four sealed small rollers; the composite sealed roller 32 is provided with four circular holes in a bearing region of the sealed large roller; and the sealed small rollers are installed at each of the circular holes.

Composite metal fan blades 103 are installed on sleeves of the ball screws 5, and lower ends of the sleeves of the ball screws 5 are fixed to shaft rings of the sealed small rollers of the composite sealed roller 32. Effects of the composite sealed roller 32: Firstly, the tightness of the outer sleeve 3 can be ensured; secondly, when the outer sleeve 3 rotates, the vertical motion of screw levers of the ball screws 5 and the rotation of the sleeves are not influenced; thirdly, vertical loads can be borne, the vertical loads are transferred to the first rotating shaft 104 through the outer sleeve 3, the first rotating shaft 104 and the brackets 42 are connected through the middle roller 43, and then the vertical loads are transferred to a lower bottom surface of the combination disc 1 by the brackets 42 to ensure that the outer sleeve 3 and the sleeves of the ball screws 3 are not vertically displaced. A top gear 34 is fixed above each ball screw 5; four top gears 34 are matched and connected with the internal gear 35 in the inner center of the top surface of the cylinder wall of the outer sleeve 3 through the gear; and the bottoms of the screw levers of the ball screws 5 extend from the cylinder through shaft rings of the sealed small rollers on the composite sealed roller 32 and then are vertically and fixedly connected with the sloshing plate 7 below.

The overhanging fan blade 4 comprises six groups of fan blade structures with the same structure, a middle roller 43 and six brackets 42 with the same structure; wherein each group of fan blade structure comprises upper fan blades 41, bracket rollers 44, the fan blade gear 45 and lower fan blades 46 successively from top to bottom, which are installed on a bracket rotating shaft 47; and six bracket rollers 44 are connected with the middle roller 43 through the brackets 42. Specifically, six upper fan blades 41 are uniformly arranged along the outer ring of the top of the cylinder wall of the outer sleeve 3 at an interval of 60°; the brackets 42 are fixed below the combination disc 1 through the vertical fixed rod 101; two ends of the six brackets 42 are fixed to seat rings of the middle roller 43 and the bracket rollers 44 respectively; the bracket rotating shaft 47 is fixed to shaft rings of the bracket rollers 44; and the middle of the first rotating shaft 104 is fixed to a shaft ring of the middle roller 43. In this way, the brackets 42 not only realize the position fixation of the bracket rotating shaft 47 and the first rotating shaft 104, but also do not affect the rotation of the upper fan blades 41 and the first rotating shaft 104. In addition, the first gear 102 is installed on the top of the first rotating shaft 104; the first gear 102 is matched and connected with the second gear 105 on the middle transverse rod 106 through the gear; and the bottom of the first rotating shaft 104 is fixed to the outer center of the top surface of the cylinder wall of the outer sleeve 3, that is, the rotation of the outer sleeve 3 drives the wheel set 2 to rotate. The dimensions of the brackets 42 are determined by the outer sleeve 3, and the fan blade gear 45 on the overhanging fan blade 4 and the external gear 33 above the outer side of the outer sleeve 3 shall be ensured to achieve gear transmission, so that the upper fan blades 41 can be driven to rotate when the outer sleeve 3 rotates. To sum up, the brackets 42 are fixed, so as to prevent the middle roller 43 and the bracket rollers 44 from vertically displacing and to prevent the first rotating shaft 104 and the bracket rotating shaft 47 fixed on the seat rings of the middle roller 43 and the bracket rollers 44 from vertically displacing, that is, the outer sleeve 3 fixed with the first rotating shaft 104 are not vertically displaced, and the composite sealed roller 32 of the bottom cover structure as the outer sleeve 3 and the sleeves of the ball screws 5 fixed to the shaft rings of the small sealed rollers remain stationary; the rotation of the outer sleeve 3 is not transferred to the upper fan blades 41 through the brackets 42, but the rotation of the upper fan blades 41 and the lower fan blades 46 is realized through the connection and transmission of the external gear 33 above the outer side of the outer sleeve 3 and the fan blade gear 45 on the overhanging fan blade 4; and moreover, the rotation of the outer sleeve 3 can simultaneously drive the wheel set 2 to rotate.

Further, the large and small annular magnets 13 and 15 of the combination disc 1 adopt axial magnetization to ensure that magnetic poles in the same height and horizontal position are identical, so that a repulsion force is generated when the two are close.

Further, an outer ring of the combination disc 1 is provided with a rubber ring 11; rubber has high damping property; and even if the combination disc 1 is fixedly installed, the rubber ring 11 is added in order to prevent the device for reducing sloshing from becoming loose in the position of fixing the combination disc 1 in normal operation, which will have an impact effect on the wall of the storage tank and damage the storage tank structure, so as to realize energy consumption and reduce the threat to the safety of the storage tank from the device for reducing sloshing.

Further, lubricating oil is applied appropriately between discs in the combination disc 1 to reduce the friction, and when the sealed large disc 12 moves, relative motion is ensured between the internal sealed middle disc 14 and the sealed large disc 12, and between the sealed middle disc 14 and the sealed small disc 17.

Further, the brackets 42 prevent the middle roller 43 and the bracket rollers 44 from vertically displacing, so that the first rotating shaft 104 and the bracket rotating shafts 47 fixed to the shaft rings do not move vertically, thereby ensuring that the lower half of the device for reducing sloshing can transfer vertical loads to the combination disc 1.

Further, a radius ratio of the top gear 34 fixed above the ball screws 5 and the internal gear 35 of the outer sleeve 3 is 2, to achieve rotation amplification, which is conducive to energy consumption.

Further, the composite metal fan blades 103 are installed on the sleeves of the ball screws 5; the fan blades rotate; and the energy consumption is more efficient due to the presence of magnetic fields and damping fluid.

Further, the sloshing plate 7 adopts flexible materials which satisfy the requirements of the device for reducing sloshing for the deformation performance and should also have certain rigidity to bear hydrodynamic pressure to achieve force transfer.

The use process of the present invention is:

When an earthquake occurs, the combination disc 1 sloshes together with the large LNG storage tank; the rubber ring 11 ensures the safety of the storage tank structure and has energy dissipation capacity; and the sealed middle disc 14 has relative displacement with the sealed large disc 12 due to inertia. Because the magnetic poles of the large annular magnet 13 and the small annular magnet 15 are identical at the same height and position during installation, the repulsion force is generated when the two are close, which further aggravates the relative motion between the sealed large disc 12 and the sealed middle disc 14. The sealed small disc 17 is driven by the sealed middle disc 14, so that the inner solid balls 18 begin to move, collide and consume energy. The disc springs 16 also deforms due to the relative displacement of the sealed middle disc 14 and the sealed small disc 17, thereby absorbing and consuming energy.

At the same time, the stored liquid in the large LNG storage tank also moves horizontally during the earthquake. Due to the flexible property of the liquid, the liquid level moves up and down, thereby causing the sloshing plate 7 to move up and down. Because the sloshing plate 7 is fixedly connected with the lower end of the screw levers of the ball screws 5, the screw levers are driven to move up and down, and the screw levers of the ball screws 5 move up and down and cause the rotation of the sleeves of the ball screws 5. Then, the composite metal fan blades 103 on the sleeves rotate in the magnetic fields generated by the damping fluid and the annular magnet 31, thereby generating the damping force and consuming energy. Concurrently, the top gear 34 fixed above the ball screws 5 also rotates, the rotation is further transferred to the internal gear 35 fixed at the inner center of the top surface of the cylinder wall of the outer sleeve 3, and the internal gear 35 transfers the rotation to the outer sleeve 3 through the second rotating shaft 107, thereby driving the outer sleeve 3 to rotate.

During the rotation of the outer sleeve 3, the outer sleeve 3 is connected through the external gear 33 fixed to the outer ring and the fan blade gear 45 on the overhanging fan blade 4; the rotation is transferred to the upper fan blades 41 and the lower fan blades 46; and the upper fan blades 41 and the lower fan blades 46 rotate and consume energy. Simultaneously, the outer sleeve 3 also transfers the rotation to the first gear 102 fixed above through the first rotating shaft 104 fixed on the outer center of the top surface of the cylinder wall, so as to drive the second gear 105 fixed to the middle transverse rod 106 to rotate. The rotation of the second gear 105 can drive the discs (that is, the wheel set 2) fixed to both ends of the middle transverse rod 106 to rotate. At this moment, the fan blades 21 fixed outside the discs and the balls 23 placed inside the discs have the energy consumption capacity.

The device for reducing sloshing in the present invention exhibits robust energy consumption capacity, can reduce the impact of liquid level sloshing caused by the earthquake on the storage tank structure, and has high safety.

Compared with the prior art, the present invention has the following beneficial effects:

1) When an earthquake occurs, the combination disc in the device for reducing sloshing for the large LNG storage tank provided by the present invention can slosh together with the large LNG storage tank, and relative sliding occurs between the sealed large disc and the middle disc and between the middle disc and the small disc of the combination disc. Due to the existence of the internal annular magnets and the springs, the relative motion among the sealed middle disc, the sealed large disc and the sealed small disc is intensified to improve the energy consumption efficiency of the internal balls and the springs.
2) At the same time, the stored liquid in the storage tank also sloshes. Due to the flexible property of the liquid, the liquid level sloshes up and down, thereby causing the sloshing plate to move up and down to drive the screw levers of the ball screws fixed to the sloshing plate. Thus, the sleeves of the ball screws rotate, and the composite metal fan blades on the sleeves rotate. Due to the existence of the damping fluid and the magnetic fields, the rotation energy consumption of the composite metal fan blades is more efficient. The sleeves of the ball screws are connected with the outer sleeve through the transmission of gears with different radii, which has the rotation amplification effect and accelerates the rotation rate of the outer sleeve. The gears with different radii are also used for transmission of the outer sleeve with the overhanging fan blades and the wheel set, which has the rotation amplification effect and increases the energy consumption efficiency. When the wheel set rotates, not only the fan blades rotate and consume energy in the stored liquid, but also the internal balls can also collide and consume energy in a rotating state.
3) In addition, the number of the middle parts of the device for reducing sloshing is only limited by the own size, and according to different actual conditions, the sizes of the middle parts of the device for reducing sloshing and the gear radius ratio can be adjusted to ensure that the device for reducing sloshing can work normally under different conditions, thereby improving the adaptability of the device for reducing sloshing and achieving the purpose of full energy consumption. The device for reducing sloshing in the present invention uses the rotation amplification effect to conduct efficient energy consumption, reduces the influence of the earthquake on the structure of the large LNG storage tank, and improves the safety of the structure of the large LNG storage tank.

DESCRIPTION OF DRAWINGS

FIG. 3(*b*) is an elevation structural schematic diagram of a combination disc in the present invention.

Figure 1:
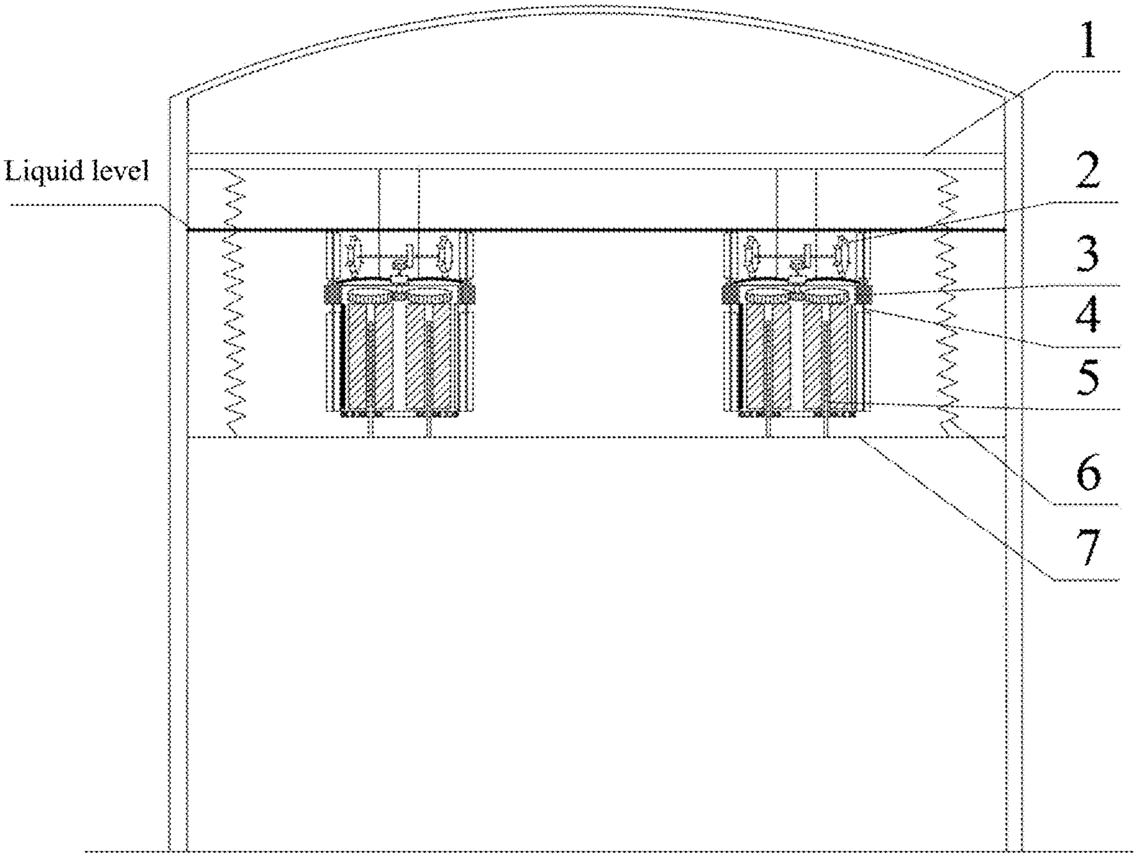
FIG. 1 is a structural schematic diagram of a device for reducing sloshing for a large LNG storage tank in the present invention.
Figure 2:
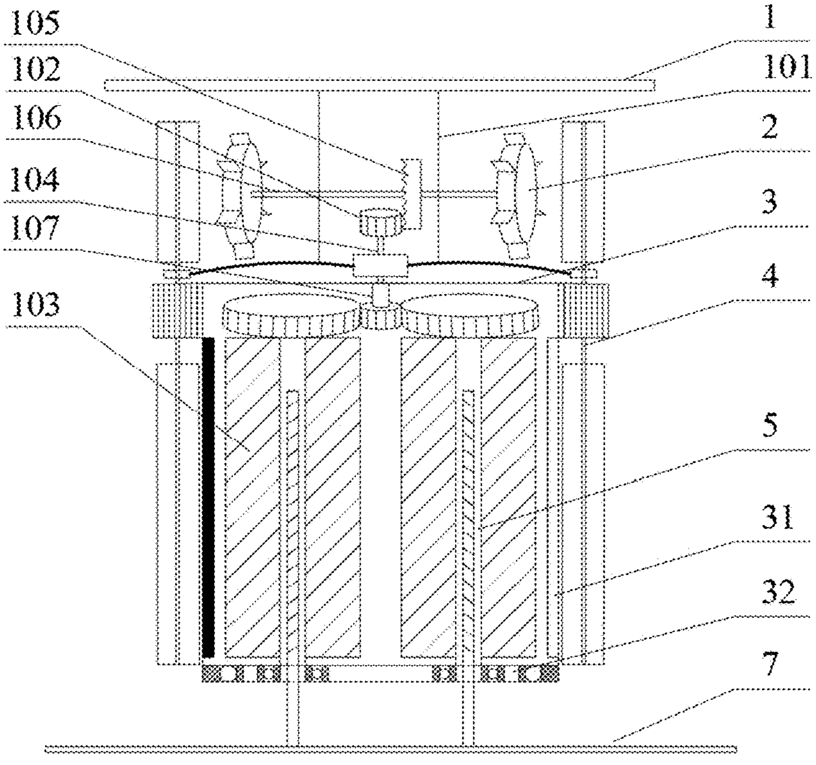
FIG. 2 is a structural schematic diagram of a device for reducing sloshing.

In the figures: 1 combination disc; 2 wheel set; 3 outer sleeve; 4 overhanging fan blade; 5 ball screw; 6 spring; 7 sloshing plate;

- 11 rubber ring; 12 sealed large disc; 13 large annular magnet; 14 sealed middle disc; 15 small annular magnet; 16 disc spring; 17 sealed small disc; 18 solid ball; 101 vertical fixed rod; 102 first gear; 103 composite metal fan blade; 104 first rotating shaft; 105 second gear; 106 middle transverse rod; 107 second rotating shaft;
- 21 fan blade; 22 baffle plate; 23 ball;
- 31 annular magnet; 32 composite sealed roller; 33 external gear; 34 top gear; 35 internal gear;
- 41 upper fan blade; 42 bracket; 43 middle roller; 44 bracket roller; 45 fan blade gear; 46 lower fan blade; 47 bracket rotating shaft.

DETAILED DESCRIPTION

The present invention is described below in detail in combination with drawings and specific embodiments.

Embodiments

The present embodiment provides a device for reducing sloshing for a large LNG storage tank, which comprises a combination disc 1, a wheel set 2, an outer sleeve 3, an overhanging fan blade 4, ball screws 5, springs 6 and a sloshing plate 7.

As shown in FIGS. 1, 2, 8, 9 and 10, the combination disc 1 is fixed on the inner wall of the large LNG storage tank and located above the liquid level. The disc surfaces of two discs of the wheel set 2 are opposite, and are fixedly connected through the middle transverse rod 106. The second gear 105 is fixed to the middle transverse rod 106, and the vertical fixed rod 101 is connected with the middle transverse rod 106 to fix the wheel set 2 below the combination disc 1. A first rotating shaft 104 is fixedly installed at the outer center of the top surface of the cylinder wall of the outer sleeve 3; and a first gear 102 fixed to an upper end of the first rotating shaft 104 is matched and connected with a second gear 105 to transfer the rotation of the outer sleeve 3 to the wheel set 2.

The overhanging fan blade 4 comprises upper fan blades 41, brackets 42, a middle roller 43, bracket rollers 44, a fan blade gear 45, lower fan blades 46 and a bracket rotating shaft 47. The overhanging fan blade 4 has six groups of fan blade structures; and each group of fan blade structure comprises the upper fan blades 41, the bracket rollers 44, the fan blade gear 45 and the lower fan blades 46 successively from top to bottom, which are uniformly arranged along the upper part of the outer ring of the outer sleeve 3 at an interval of 60°. The brackets 42 of the overhanging fan blade 4 are fixed below the combination disc 1 through the vertical fixed rod 101, i.e., the brackets 42 are fixed brackets. Six groups of fan blade structures are connected with the first rotating shaft 104 through six brackets 42. The connections of the brackets 42 with each group of fan blades and the first rotating shaft 104 are connected by the bracket rollers 44 and the middle roller 43 respectively. That is, two ends of the brackets 42 are fixed to seat rings of the middle roller 43 and the bracket rollers 44 respectively; the bracket rotating shaft 47 is fixed to shaft rings of the bracket rollers 44; and the middle of the first rotating shaft 104 is fixed to a shaft ring of the middle roller 43. The brackets 42 not only realize the position fixation of the bracket rotating shaft 47 and the first rotating shaft 104, but also ensure that the upper fan blades 41 and the first rotating shaft 104 can rotate. To sum up, the brackets 42 are fixed, so as to prevent the middle roller 43 and the bracket rollers 44 from vertically displacing and to prevent the first rotating shaft 104 and the bracket rotating shaft 47 fixed on the seat rings of the middle roller 43 and the bracket rollers 44 from vertically displacing, that is, the outer sleeve 3 fixedly connected with the first rotating shaft 104 cannot displace vertically, and the composite sealed roller 32 of the bottom cover structure as the outer sleeve 3 and the sleeves of the ball screws 5 fixed to the shaft rings of the small sealed rollers cannot move vertically; the dimensions of the brackets 42 are determined by the outer sleeve 3 to ensure that the fan blade gear 45 on the overhanging fan blade 4 and the external gear 33 above the outer side of the outer sleeve 3 achieve gear transmission, so that the upper fan blades 41 are driven to rotate. That is, the rotation of the outer sleeve 3 is not transferred to the upper fan blades 41 through the brackets 42, but the rotation of the upper fan blades 41 is realized through the connection and transmission of the external gear 33 above the outer side of the outer sleeve 3 and the fan blade gear 45 on the overhanging fan blade 4; and moreover, the rotation of the outer sleeve 3 can simultaneously drive the wheel set 2 to rotate.

The lower parts of the screw levers of the ball screws 5 are vertical and fixedly connected with the sloshing plate 7, and the screw levers can move up and down along with the sloshing plate 7. The springs 6 is used for connecting the combination disc 1 and the sloshing plate 7.

Figure 3A:
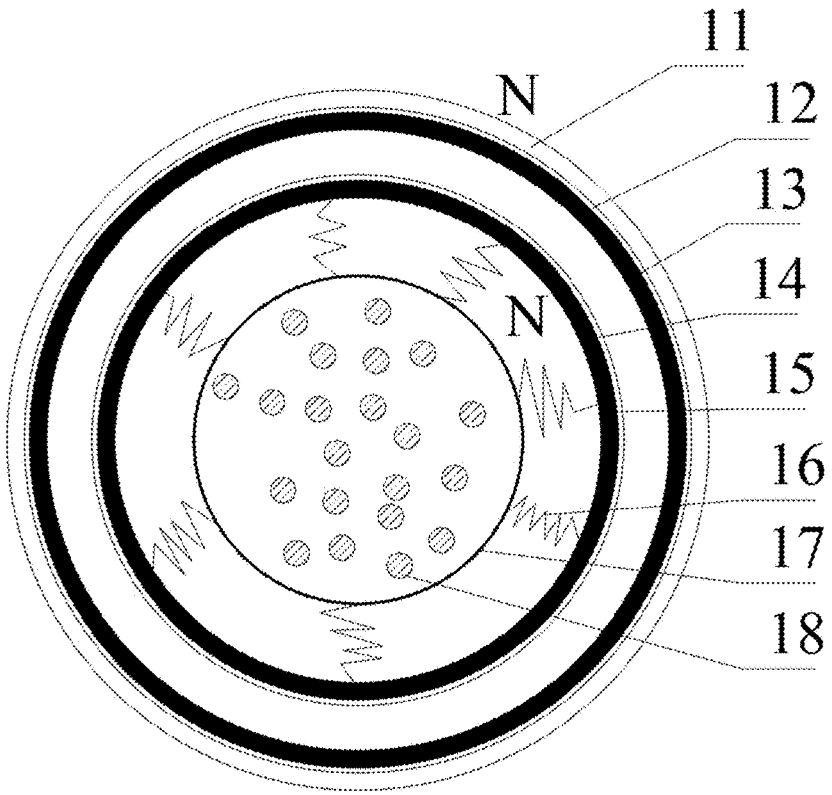
FIG. 3(*a*) is a planar structural schematic diagram of a combination disc in the present invention.
Figure 3B:
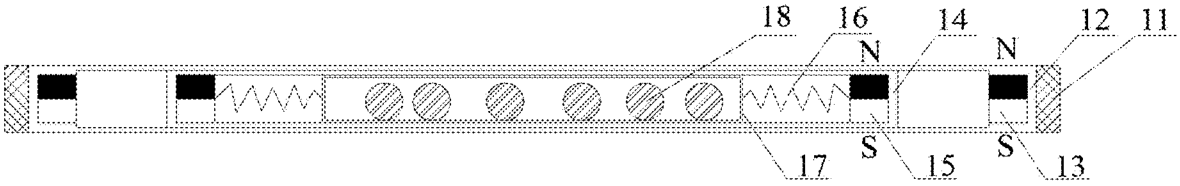

As shown in FIGS. 3(*a*) and 3(*b*), the combination disc 1 is composed of three large, middle and small sealed hollow discs with different radii, a large annular magnet 13, a small annular magnet 15, disc springs 16 and a rubber ring 11; the three large, middle and small hollow discs are a sealed large disc 12, a sealed middle disc 14 and a sealed small disc 17 respectively. Initially, the three discs are concentric; however, during the sloshing process of a liquid level, they become eccentric due to the application of force. The rubber ring 11 is fixed on an outer side surface of the sealed large disc 12; the large annular magnet 13 is installed on an inner side surface of the sealed large disc 12; the small annular magnet 15 is installed on an inner side surface of the sealed middle disc 14; and a plurality of solid balls 18 are placed inside the sealed small disc 17. The sealed small disc 17 is installed in the sealed middle disc 14, and the two are connected through the disc springs 16; then, the sealed middle disc 14 is installed in the sealed large disc 12; the rubber ring 11 is fixed to the outer ring of the sealed large disc 12 to form the combination disc 1, that is, the outer diameter of the sealed small disc 17 is less than the inner diameter of the sealed middle disc 14; the disc springs 16 is installed in a gap after the combination; and the outer diameter size of the sealed middle disc 14 is matched with the inner diameter size of the large disc. The large and small annular magnets 13 and 15 adopt axial magnetization to ensure that magnetic poles in the same height and position are identical, so that a repulsion force is generated when the two are close. The inner diameter of the rubber ring 11 is equal to the outer diameter of the sealed large disc 12, and they are tightly fitted and fixedly installed together. The combination disc 1 is currently considered to be fixed inside the body of the LNG storage tank through the brackets and located above the liquid level. The heights of the brackets can be adjusted in accordance with the height of the liquid level of the stored liquid, so as to ensure that the device for reducing sloshing can work normally.

Figure 4:
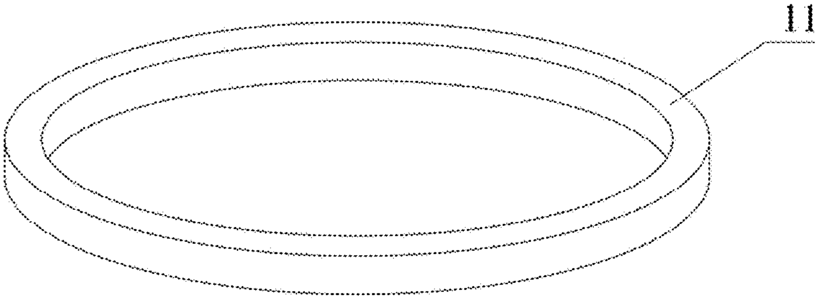
FIG. 4 is a structural schematic diagram of a rubber ring in the present invention.

As shown in FIG. 4, the rubber ring 11 is installed on the outer ring of the combination disc 1; rubber has high damping property; and even if the combination disc 1 is fixedly installed, the rubber ring 11 is added in order to prevent the device for reducing sloshing from becoming loose in the position of fixing the combination disc 1 in normal operation, which will have an impact effect on the wall of the storage tank and damage the storage tank structure, so as to realize energy consumption and reduce the threat to the safety of the storage tank from the device for reducing sloshing.

Figure 5:
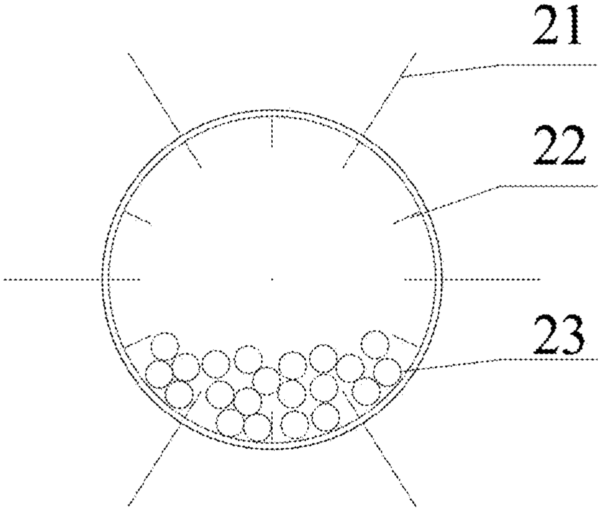
FIG. 5 is a structural schematic diagram of a wheel disc of a wheel set.

As shown in FIG. 5, the wheel discs of the wheel set 2 are disc structures; six fan blades 21 are uniformly installed along the circumference of the wheel discs at a spacing of 60°; baffle plates 22 are installed at equal intervals inside the wheel discs; and a plurality of balls 23 are placed inside. The wheel set 2 comprises two discs, and the disc surfaces of two wheel discs are opposite. After the two are connected through the middle transverse rod 106, the two are fixed below the combination disc 1 through the connection between the vertical fixed rod 101 and the middle transverse rod 106, and the second gear 105 is fixed on the middle transverse rod 106. The connection between the vertical fixed rod 101 and the middle transverse rod 106 is connected by the roller. The vertical fixed rod 101 is fixed on the seat ring of the roller, and the middle transverse rod 106 is fixed on the shaft ring of the roller, so as to ensure that the vertical fixed rod 101 cannot affect the rotation of the middle transverse rod 106, that is, two wheel discs can rotate by force.

Figure 6:
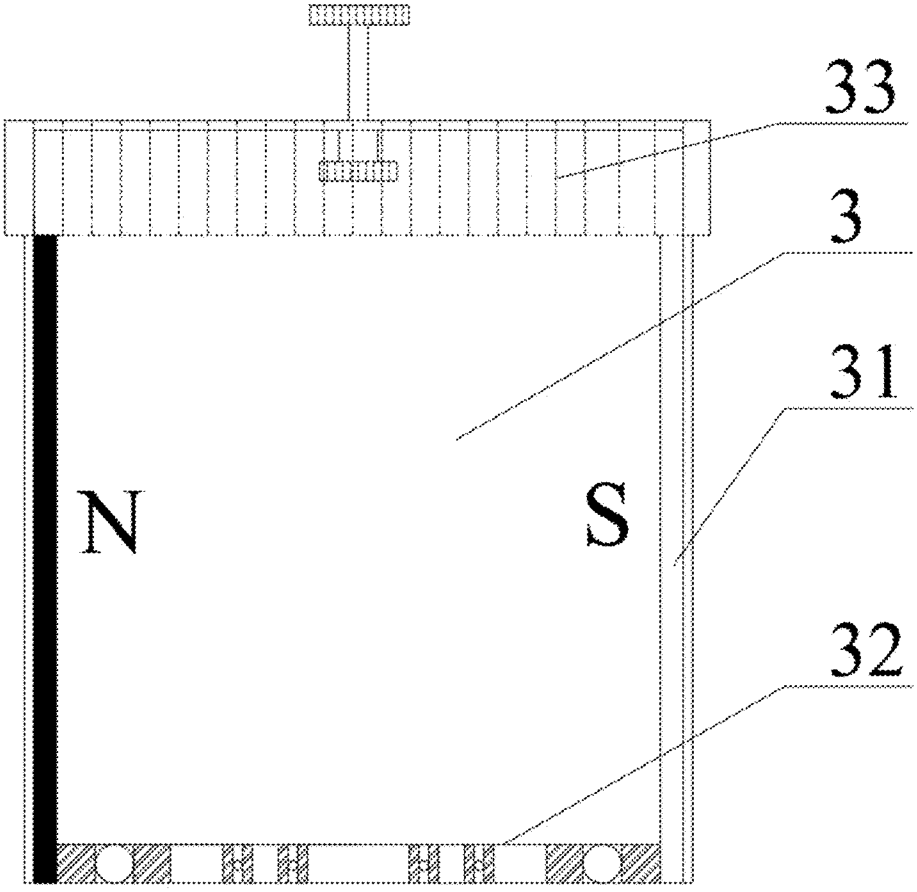
FIG. 6 is a structural schematic diagram of an outer sleeve.
Figure 7:
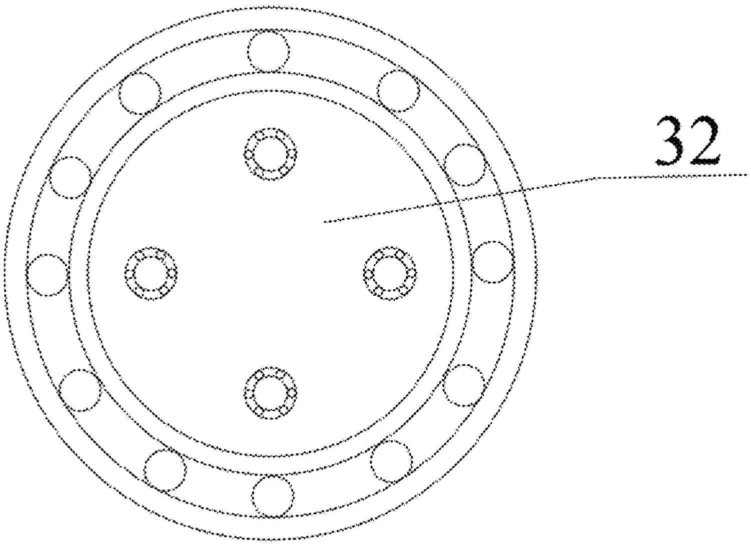
FIG. 7 is a structural principle schematic diagram of a composite sealed roller.
Figure 8:
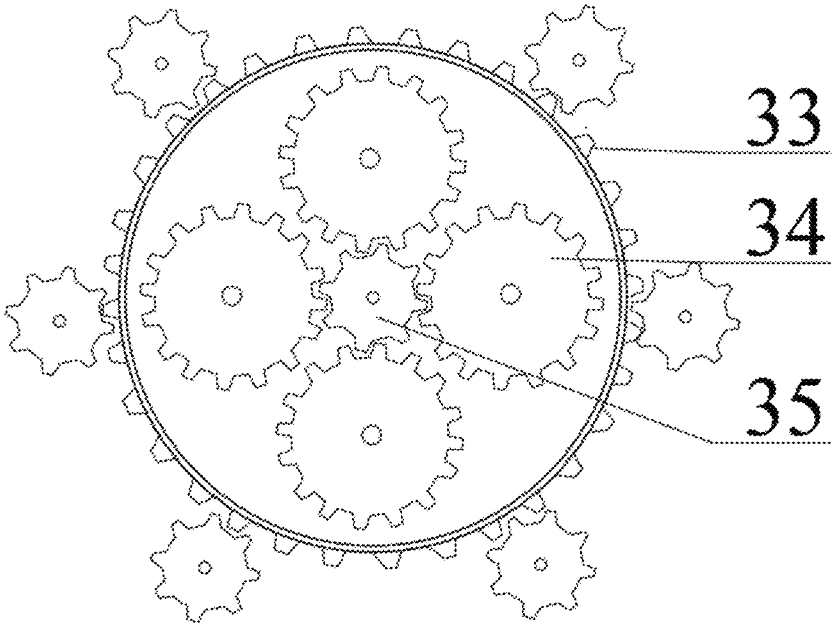
FIG. 8 is a sectional view of gears in an outer sleeve.
Figure 9:
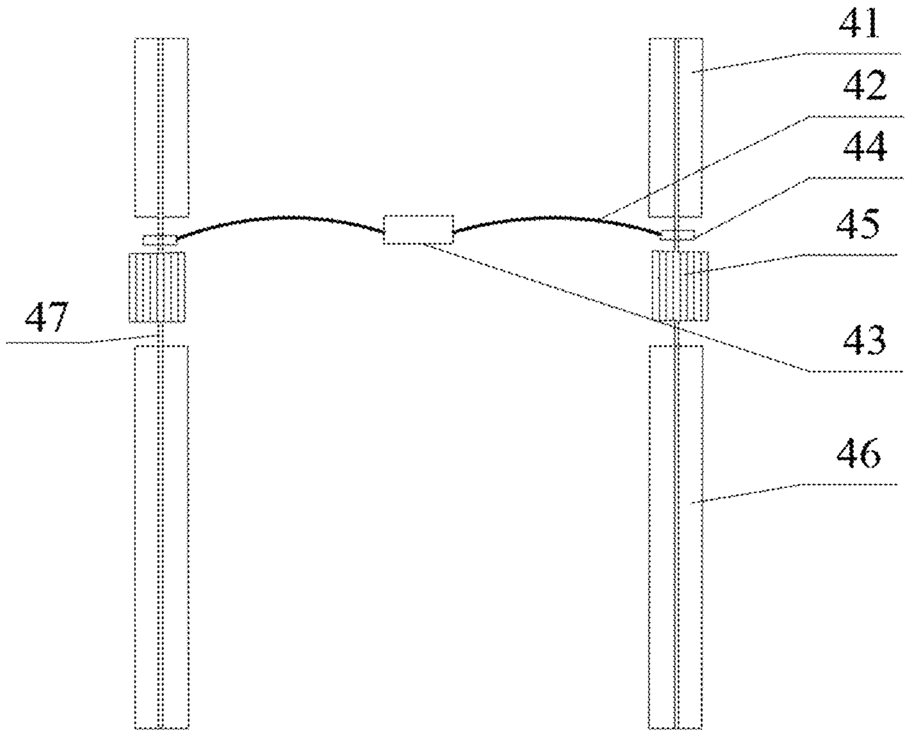
FIG. 9 is a structural schematic diagram of an overhanging fan blade.
Figure 10:
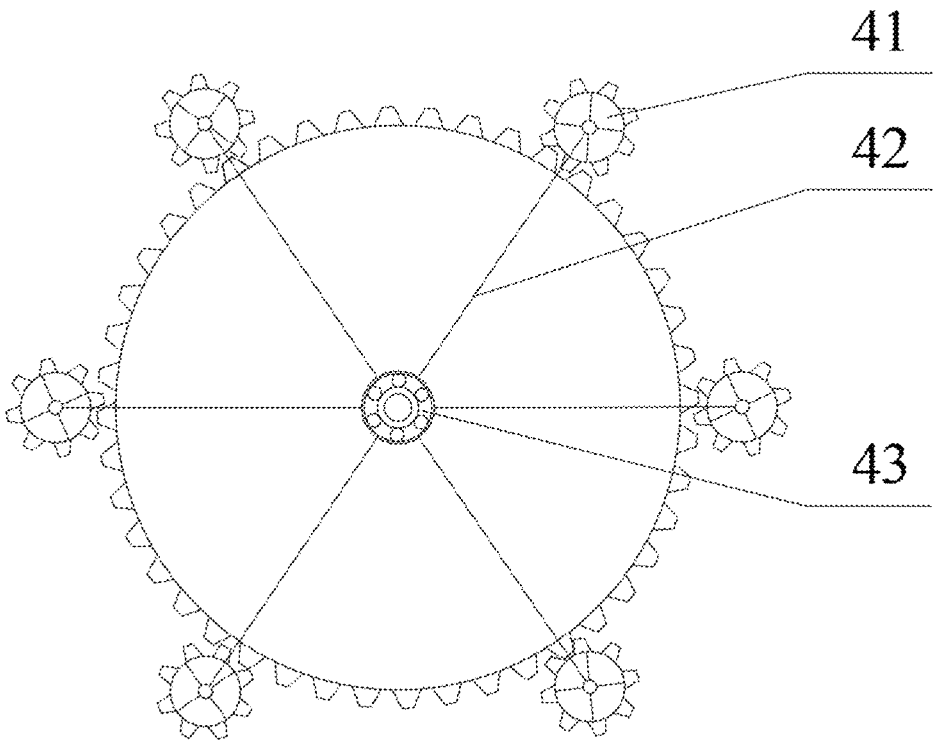
FIG. 10 is a top view of an overhanging fan blade.

As shown in FIGS. 6 and 7, the outer sleeve 3 is a sealed cylinder; the annular magnet 31 is installed on the inner side surface of a cylinder wall; damping fluid is filled inside and four ball screws 5 are installed; a second rotating shaft 107 is fixedly installed at the inner center of a top surface of the cylinder wall of the outer sleeve 3; a lower end of the second rotating shaft 107 is provided with an internal gear 35; a first rotating shaft 104 is fixedly installed at the outer center of the top surface of the cylinder wall of the outer sleeve 3; an upper end of the first rotating shaft 104 is provided with a first gear 102, that is, the upper end of the first rotating shaft 104 is fixedly connected with the first gear 102, and the lower end is fixed to the outer center of the top surface of the cylinder wall of the outer sleeve 3; an upper end of the second rotating shaft 107 is fixed to the inner center of the top surface of the cylinder wall of the outer sleeve 3 and a lower end is fixedly connected with the internal gear 35. An external gear 33 is arranged on the outer side of the top of the cylinder wall of the outer sleeve 3, and the external gear 33 is matched with a fan blade gear 45 of the overhanging fan blade 4. A bottom cover structure of the outer sleeve 3 is a composite sealed roller 32, which is composed of a sealed large roller and four sealed small rollers; the composite sealed roller 32 is provided with four circular holes in a bearing region of the sealed large roller; and the sealed small rollers are installed at each of the circular holes.

The composite metal fan blades 103 are installed on the sleeves of the ball screws 5; the sleeves of the ball screws 5 are fixed on the shaft rings of the sealed small rollers of the composite sealed roller 32; and the screw levers of the four ball screws 5 pass through the shaft rings of four sealed small rollers respectively. A top gear 34 is fixed above each ball screw 5; four top gears 34 are matched and connected with the internal gear 35 in the inner wall center of the cylinder of the top surface of the outer sleeve 3 through the gear; and the bottoms of the screw levers of the ball screws 5 extend from the cylinder through shaft rings of the sealed small rollers on the composite sealed roller 32 and then are vertically and fixedly connected with the sloshing plate 7 below. The sloshing plate 7 adopts flexible materials which satisfy the requirements of the device for reducing sloshing for the deformation performance and should also possess sufficient rigidity to bear hydrodynamic pressure to achieve force transfer.

For the device for reducing sloshing in the present invention, when an earthquake occurs:

The combination disc 1 sloshes together with the large LNG storage tank; the rubber ring 11 ensures the safety of the storage tank structure and has energy dissipation capacity; and the sealed middle disc 14 experiences relative displacement against the sealed large disc 12 due to inertia. Because the magnetic poles of the large annular magnet 13 and the small annular magnet 15 are identical at the same height and position during installation, the repulsion force is generated when the two are close, which intensifies the relative motion between the sealed large disc 12 and the sealed middle disc 14. Driven by the sealed middle disc 14, the inner solid balls 18 of the sealed small disc 17 begin to move, collide and consume energy. The disc springs 16 also deforms due to the relative displacement of the sealed middle disc 14 and the sealed small disc 17, thereby absorbing energy and consuming energy. The stored liquid in the large LNG storage tank also moves horizontally. Due to the flexible property of the liquid, the liquid level moves up and down, thereby causing the sloshing plate 7 to move up and down. Because the sloshing plate 7 is fixedly connected with the lower end of the screw levers of the ball screws 5, the screw levers are driven to move up and down, and the screw levers of the ball screws 5 move up and down and cause the rotation of the sleeves of the ball screws 5. Then, the composite metal fan blades 103 on the sleeves rotate in the magnetic fields generated by the damping fluid and the annular magnet 31, thereby generating the damping force and consuming energy. Concurrently, the top gear 34 fixed above the ball screws 5, also rotates, the rotation is further transferred to the internal gear 35 fixed at the inner wall center of the cylinder of the top surface of the outer sleeve 3, and the internal gear 35 transfers the rotation to the outer sleeve 3 through the second rotating shaft 107, thereby driving the outer sleeve 3 to rotate. The outer sleeve 3 is connected through the external gear 33 fixed above outside and the fan blade gear 45; the rotation is transferred to the upper fan blades 41; and the upper fan blades 41 rotate and consume energy. Simultaneously, the outer sleeve 3 also transfers the rotation to the first gear 102 fixed above through the first rotating shaft 104 fixed on the outer center of the top surface of the cylinder wall, so as to drive the second gear 105 fixed to the middle transverse rod 106 to rotate; as a result, two discs, known as the wheel set 2, fixed to both ends of the middle transverse rod 106, rotate concurrently. At this moment, the fan blades outside the discs and the balls placed inside the discs have the energy consumption capacity. The device for reducing sloshing in the present invention has strong energy consumption capacity, can reduce the influence of liquid level sloshing caused by the earthquake on the storage tank structure, and has high safety.

In the present embodiment, a resetting mechanism is the springs 6. Each spring 6 comprises a connecting part on the bottom surface of the combination disc 1 and a connecting part on the sloshing plate 7, to provide a restoring force.

The above embodiments only express the implementation of the present invention, and shall not be interpreted as a limitation to the scope of the patent for the present invention.

It should be noted that, for those skilled in the art, several variations and improvements are made without departing from the concept of the present invention, all of which belong to the protection scope of the present invention.

The invention claimed is:

1. A gear transmission and rotation amplification type device for reducing sloshing, arranged inside and located above a body of an LNG storage tank, comprising: a combination disc, a wheel set, an outer sleeve, an overhanging fan blade, ball screws, springs and a sloshing plate, wherein the combination disc is connected with the sloshing plate below through the springs; the combination disc is fixed above an inner wall surface of the body of the LNG storage tank; the sloshing plate is fitted and not fixedly connected with the inner wall surface of the body of the LNG storage tank; the wheel set, the outer sleeve, the overhanging fan blade and the ball screws are arranged between the combination disc and the sloshing plate; and except for the combination disc and the springs, the others are located below a liquid level in the LNG storage tank.

2. The gear transmission and rotation amplification type device for reducing sloshing according to claim 1, wherein the combination disc comprises three large, middle and small sealed hollow discs, a large annular magnet, a small annular magnet and a rubber ring, wherein the three large, middle and small sealed hollow discs are a sealed large disc, a sealed middle disc and a sealed small disc respectively; the three are concentric structures in initial states and are eccentric in a sloshing process; the rubber ring is fixed on an outer ring of the sealed large disc; the large annular magnet is installed on an inner ring of the sealed large disc; the small annular magnet is installed on an inner side surface of the sealed middle disk; a plurality of solid balls are placed inside the sealed small disc; the sealed small disc is installed in the sealed middle disc, and the two are connected through the disc springs; the sealed middle disc is installed in the sealed large disc to form the combination disc; the combination disc is fixed inside the body and located above the liquid level, wherein the wheel set is located below the combination disc, and comprises two wheel discs with the same structure; the wheel discs are disc structures; six fan blades are uniformly installed along the outer circumference of the disc; baffle plates are installed at equal intervals at the inner circumference of the wheel discs, and a plurality of balls are placed; disc surfaces of the two wheel discs are opposite and fixed at both ends of a middle transverse rod respectively; a second gear is also fixed to the middle transverse rod; the middle transverse rod is connected with a vertical fixed rod; the vertical fixed rod is connected with the middle transverse rod without affecting the rotation of the middle transverse rod, that is, the two wheel discs can rotate by force; a top end of the vertical fixed rod is fixedly connected with a bottom surface of the combination disc, a bottom end is connected with brackets of the overhanging fan blade, and a middle part is socketed with the middle transverse rod after bent, wherein the outer sleeve is a sealed cylinder; an annular magnet is installed on the inner side surface of a cylinder wall; damping fluid is filled inside and four ball screws are installed; a second rotating shaft is fixedly installed at the inner center of a top surface of the cylinder wall of the outer sleeve; a lower end of the second rotating shaft is provided with an internal gear; a first rotating shaft is fixedly installed at the outer center of the top surface of the cylinder wall of the outer sleeve; an upper end of the first rotating shaft is provided with a first gear; an external gear is arranged on the outer side of the top of the cylinder wall of the outer sleeve, and the external gear is matched with a fan blade gear of the overhanging fan blade; a bottom cover structure of the outer sleeve is a composite sealed roller, which is composed of a sealed large roller and four sealed small rollers; the composite sealed roller is provided with four circular holes in a bearing region of the sealed large roller; and the sealed small rollers are installed at each of the circular holes, wherein composite metal fan blades are installed on the sleeves of the ball screws; the lower ends of the sleeves of the ball screws are fixed on the shaft ring of the sealed small rollers of the compound closed roller; the effects of the compound closed roller are that: firstly, the tightness of the outer sleeve can be ensured; secondly, when the outer sleeve rotates, the vertical motion of screw levers of the ball screws and the rotation of the sleeves are not influenced; thirdly, vertical loads can be borne, the vertical loads are transferred to the first rotating shaft through the outer sleeve, the first rotating shaft and the brackets are connected through the middle roller, and then the vertical loads are transferred to a lower bottom surface of the combination disc by the brackets to ensure that the outer sleeve is not vertically displaced; a top gear is fixed above each ball screw; four top gears are matched and connected with the internal gear through the gear; and the lower ends of the screw levers of the ball screws extend from the cylinder through shaft rings of the sealed small rollers on the composite sealed roller and then are vertically and fixedly connected with the sloshing plate, and wherein the overhanging fan blade comprises six groups of fan blade structures with the same structure, a middle roller and six brackets with the same structure; wherein each group of fan blade structure comprises upper fan blades, bracket rollers, the fan blade gear and lower fan blades successively from top to bottom, which are installed on a bracket rotating shaft; and six bracket rollers are connected with the middle roller through the brackets.

3. The gear transmission and rotation amplification type device for reducing sloshing according to claim 2, wherein the overhanging fan blade is specifically as follows:

six upper fan blades are uniformly arranged along the outer ring of the top of the cylinder wall of the outer sleeve; the brackets are fixed below the combination disc through fixed connection with the lower end of the vertical fixed rod; two ends of the six brackets are fixed to seat rings of the middle roller and the bracket rollers respectively; the bracket rotating shaft is fixed to shaft rings of the bracket rollers; the middle of the first rotating shaft is fixed to a shaft ring of the middle roller; the brackets can realize the position fixation of the bracket rotating shaft and the first rotating shaft without affecting the rotation of the upper fan blades and the first rotating shaft; in addition, the first gear is installed on the top of the first rotating shaft; the first gear is matched and connected with the second gear on the middle transverse rod through the gear; the bottom of the first rotating shaft is fixed to the outer center of the top surface of the cylinder wall of the outer sleeve, that is, the rotation of the outer sleeve drives the wheel set to rotate; the dimensions of the brackets are determined by the outer sleeve, and the fan blade gear on the overhanging fan blade and the external gear at the outer side of the top of the cylinder wall of the outer sleeve shall be ensured to achieve gear transmission, so that the upper fan blades can be driven to rotate when the outer sleeve rotates.

4. The gear transmission and rotation amplification type device for reducing sloshing according to claim 3, wherein the large annular magnet and the small annular magnet of the combination disc adopt axial magnetization to ensure that magnetic poles in the same height and horizontal position are identical, so that a repulsion force is generated when the two are close.

5. The gear transmission and rotation amplification type device for reducing sloshing according to claim 4, wherein when an earthquake occurs:

the combination disc sloshes together with the storage tank; the rubber ring ensures the safety of the storage tank structure and has energy dissipation capacity; the sealed middle disc has relative displacement with the sealed large disc; a repulsion force is generated when the large annular magnet and the small annular magnet are close, which further aggravates the relative motion between the sealed large disc and the sealed middle disc; the sealed small disc is driven by the sealed middle disc so that the inner solid balls collide and consume energy; the disc springs also deforms due to the relative displacement of the sealed middle disc and the sealed small disc, thereby consuming energy;

meanwhile, a liquid level of stored liquid in the storage tank moves up and down in an earthquake process, causing that the sloshing plate moves up and down; then, the sloshing plate drives the screw levers of the ball screws to move up and down, which causes the rotation of the sleeves of the ball screws; accordingly, the composite metal fan blades on the sleeves rotate in magnetic fields generated by the damping fluid and the annular magnet, thereby generating the damping force and consuming energy; and at the same time, the top gear fixed above the ball screws also rotates, the rotation is further transferred to the internal gear fixed at the inner center of the top surface of the cylinder wall of the outer sleeve, and the internal gear transfers the rotation to the outer sleeve through the second rotating shaft, thereby driving the outer sleeve to rotate and consuming energy.

* * * * *